(12) United States Patent
Celedon et al.

(10) Patent No.: US 9,345,941 B1
(45) Date of Patent: May 24, 2016

(54) PIÑATA POLE SUPPORT ASSEMBLY

(71) Applicants: Manuel Celedon, Houston, TX (US);
Linda Celedon, Houston, TX (US)

(72) Inventors: Manuel Celedon, Houston, TX (US);
Linda Celedon, Houston, TX (US)

( * ) Notice: Subject to any disclaimer, the term of this patent is extended or adjusted under 35 U.S.C. 154(b) by 0 days.

(21) Appl. No.: 14/617,294

(22) Filed: Feb. 9, 2015

(51) Int. Cl.
| *A63B 67/10* | (2006.01) |
| *A63H 17/12* | (2006.01) |
| *F16M 11/22* | (2006.01) |
| *B66C 23/16* | (2006.01) |
| *A63B 71/02* | (2006.01) |

(52) U.S. Cl.
CPC .............. *A63B 67/10* (2013.01); *A63B 71/023* (2013.01); *A63H 17/12* (2013.01); *B66C 23/166* (2013.01); *F16M 11/22* (2013.01); *A63B 2225/093* (2013.01); *B66D 2700/026* (2013.01)

(58) Field of Classification Search
CPC ...... A63H 17/12; B66C 23/166; A63B 67/10; A63B 71/023; A63B 2225/093; B66D 2700/026
USPC ..................... 248/85, 156, 519, 530, 532, 533
See application file for complete search history.

(56) References Cited

U.S. PATENT DOCUMENTS

| 873,374 | A | * | 12/1907 | Jenkins | 212/179 |
| 2,109,304 | A | * | 2/1938 | Ormsby | 212/253 |
| 2,338,317 | A | * | 1/1944 | Coates | 212/179 |
| 3,162,113 | A | * | 12/1964 | Tallaksen | 99/446 |
| 3,186,711 | A | * | 6/1965 | Morrow | 472/118 |
| 3,861,679 | A | * | 1/1975 | Culpepper | 473/429 |
| 3,893,669 | A | * | 7/1975 | Myers | 473/418 |
| 4,145,044 | A | * | 3/1979 | Wilson et al. | 473/483 |
| 4,158,458 | A | * | 6/1979 | Gomez | 473/575 |
| 4,462,599 | A | * | 7/1984 | Brown | 473/430 |
| 4,576,379 | A | * | 3/1986 | Juhasz | 473/430 |
| 4,787,872 | A | * | 11/1988 | Bajo | 446/5 |
| 4,832,337 | A | | 5/1989 | Estrada | |
| 4,854,297 | A | * | 8/1989 | Shuman | 126/30 |
| 5,060,946 | A | * | 10/1991 | Taylor | 473/429 |
| 5,255,911 | A | * | 10/1993 | Preston et al. | 473/423 |
| 5,263,889 | A | * | 11/1993 | Ledonne | 446/5 |
| 5,303,914 | A | * | 4/1994 | Cooksey | 473/429 |
| 5,413,515 | A | * | 5/1995 | Knox | 446/75 |
| 5,445,487 | A | * | 8/1995 | Koscinski, Jr. | 414/543 |
| 5,454,561 | A | * | 10/1995 | Smith | 473/429 |
| 5,460,353 | A | * | 10/1995 | Rittenhouse | 256/1 |
| 5,472,186 | A | * | 12/1995 | Paulsen | 473/429 |
| D376,885 | S | * | 12/1996 | Carey et al. | D34/28 |
| 5,588,907 | A | * | 12/1996 | DePietro et al. | 452/187 |
| 5,590,618 | A | * | 1/1997 | Marshall | 114/343 |
| 5,725,112 | A | * | 3/1998 | Thorby | 212/180 |
| 5,791,858 | A | * | 8/1998 | Sasser | 414/462 |
| 5,833,555 | A | * | 11/1998 | Jer-Min | 473/429 |
| 5,881,495 | A | * | 3/1999 | Clark | 47/48.5 |
| 5,924,930 | A | * | 7/1999 | Stewart | 473/29 |
| 6,086,488 | A | * | 7/2000 | Sanders | 473/423 |

(Continued)

FOREIGN PATENT DOCUMENTS

| CA | 2406705 A1 * | 4/2003 |
| WO | WO 2012058476 A1 * | 5/2012 |

*Primary Examiner* — Terrell McKinnon
*Assistant Examiner* — Eret McNichols
(74) *Attorney, Agent, or Firm* — Kyle A. Fletcher, Esq.

(57) ABSTRACT

The piñata pole support assembly is a structure that holds a piñata in place during celebrations. The piñata pole support assembly comprises a stand, vertical pole, top pole, brace, pulley, ground post, rope hook, stick holder, and a plurality of hold down pins.

15 Claims, 5 Drawing Sheets

(56) References Cited

U.S. PATENT DOCUMENTS

| | | | |
|---|---|---|---|
| 6,354,904 B1 * | 3/2002 | Grey et al. .................... 446/5 |
| 6,401,739 B1 * | 6/2002 | Bright et al. .................. 135/98 |
| 6,412,736 B1 | 7/2002 | Zaragoza |
| 6,575,853 B1 * | 6/2003 | O'Neill et al. ............... 473/481 |
| 6,669,152 B2 | 12/2003 | Hernandez |
| 6,685,146 B1 | 2/2004 | Sanchez, Jr. |
| 6,978,974 B1 | 12/2005 | Marasco |
| D542,501 S | 5/2007 | Lopez |
| 7,350,770 B1 * | 4/2008 | Boyer ........................... 254/332 |
| 7,367,462 B1 * | 5/2008 | McMurray et al. ......... 212/179 |
| 7,699,292 B2 * | 4/2010 | Barnett ......................... 254/334 |
| 8,550,065 B2 * | 10/2013 | Johnson ........................ 126/30 |
| 8,585,516 B1 * | 11/2013 | Buono et al. ................. 473/423 |
| 8,678,872 B1 * | 3/2014 | Valencia ......................... 446/5 |
| 8,684,335 B2 * | 4/2014 | Hayes ........................... 254/323 |
| 8,784,240 B1 * | 7/2014 | Buono et al. ................. 473/423 |
| 8,893,426 B2 * | 11/2014 | Jaeger ............................... 43/3 |
| 8,938,905 B1 * | 1/2015 | Moore ............................. 43/2 |
| 9,011,277 B2 * | 4/2015 | Schell ........................... 473/429 |
| 9,017,228 B2 * | 4/2015 | Hodges ......................... 482/87 |
| 9,156,664 B1 * | 10/2015 | Lopez |
| 2002/0168258 A1 * | 11/2002 | Philipps et al. .............. 414/462 |
| 2003/0098786 A1 * | 5/2003 | Bishop .......................... 340/435 |
| 2004/0169121 A1 * | 9/2004 | Winn ............................ 248/530 |
| 2008/0073468 A1 | 3/2008 | Arroyo |
| 2009/0173709 A1 * | 7/2009 | Spitsbergen ................. 212/292 |
| 2012/0223042 A1 * | 9/2012 | McNiff .......................... 212/295 |
| 2012/0312937 A1 | 12/2012 | Weber |
| 2013/0056607 A1 * | 3/2013 | Mortezazadeh .............. 248/530 |
| 2013/0075353 A1 * | 3/2013 | Thompson .................... 212/180 |
| 2015/0159337 A1 * | 6/2015 | Kellner ......................... 248/156 |
| 2015/0321069 A1 * | 11/2015 | Rogers ....................... 29/525.08 |

* cited by examiner

PIÑATA POLE SUPPORT ASSEMBLY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of games and game accessories, more specifically, an accessory configured for use with piñatas.

SUMMARY OF INVENTION

The piñata pole support assembly is a structure that holds a piñata in place during celebrations. The components of the piñata pole support assembly comprise a stand, a ground post, a plurality of hold down pins, a vertical pole, a top pole, a brace, a pulley, associated hardware and optional accessories.

These together with additional objects, features and advantages of the piñata pole support assembly will be readily apparent to those of ordinary skill in the art upon reading the nonetheless illustrative, embodiments when taken in conjunction with the accompanying drawings.

In this respect, before explaining the current embodiments of the piñata pole support assembly in detail, it is to be understood that the piñata pole support assembly is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the piñata pole support assembly.

It is therefore important that the claims be regarded as including such equivalent construction insofar as they do not depart from the spirit and scope of the piñata pole support assembly. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description meant to be exemplary illustrations provided to enable persons skilled in the art to practice the disclosure and are not intended to limit the scope of the appended claims.

DETAILED DESCRIPTION OF THE EMBODIMENT

Figure 1:
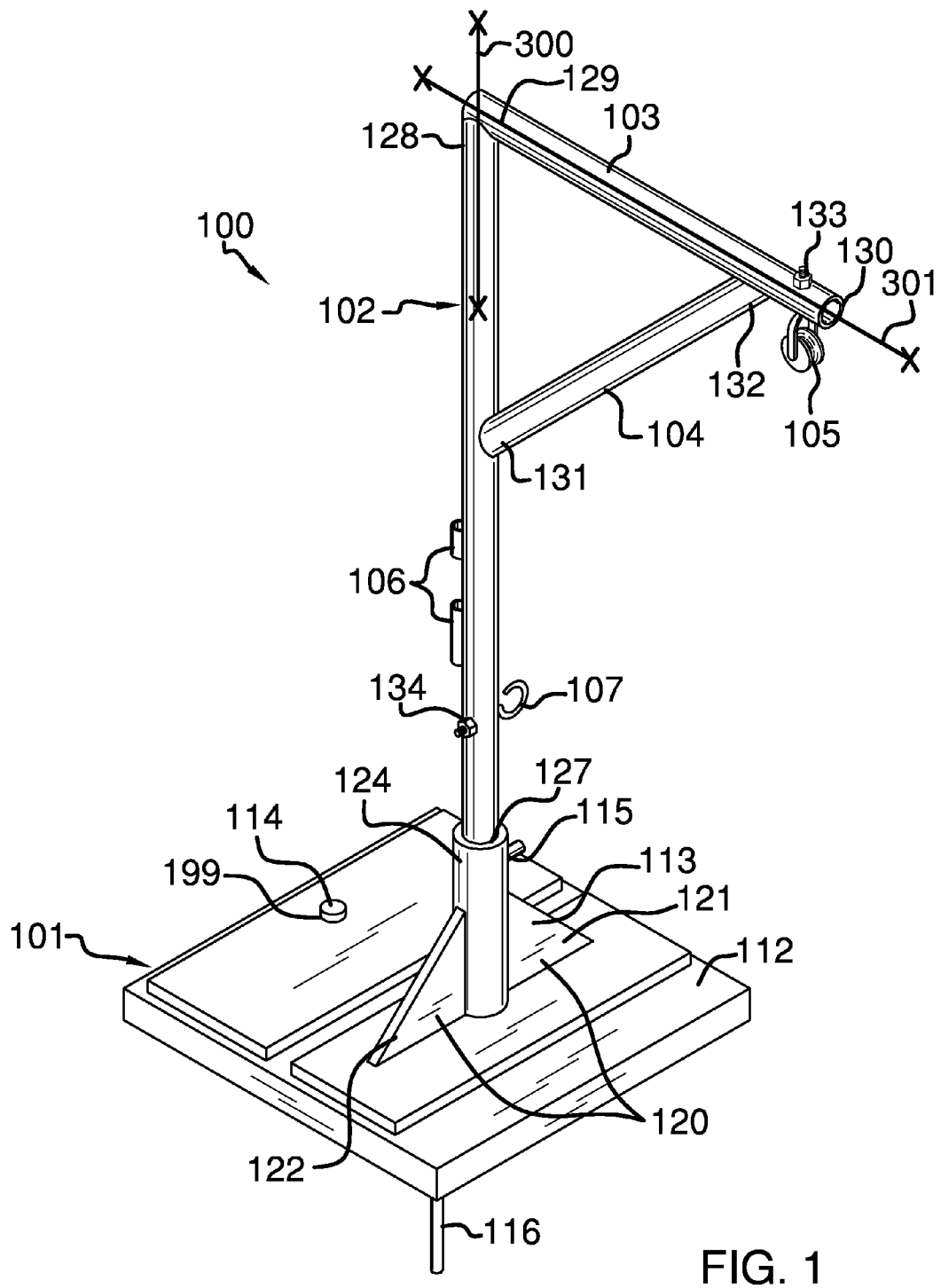
FIG. 1 is an isometric view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

In the specification and claims, the following definitions will be used:

Pipe: As used in this disclosure, the term pipe is used to describe a rigid hollow cylinder. While pipes that are suitable for use in this disclosure are often used to transport on convey fluids or gasses, the purpose of the pipes in this disclosure are structural. In this disclosure, the terms inner diameter of a pipe and outer diameter are used as they would be used by those skilled in the plumbing arts.

Centerline: As used in this disclosure, the centerline is the axis of the pipe cylinder. When two pipes are centered on the same line this means that the cylinders of both pipes share the same axis.

Detailed reference will now be made to a first potential embodiment of the disclosure, which is illustrated in FIGS. 1 through 6. The piñata pole support assembly 100 (hereinafter pole 102, a top pole 103, a brace 104, a pulley 105 and associated hardware and optional accessories.

The stand 101 comprises a base 112, footing 113, lock pin 115, center hold down pin 116, and an insert plug 114.

The base 112 is the platform to support the invention 100. The base 112 is in the shape of a rectangular block with a hollow center. A bottom 125 of the base 112 is adapted to be placed on a ground surface 200. A top 126 of the base 112 is the face of the rectangular block that is not adjacent to the bottom 125 of the base 112. The base 112 is formed with a ballast hole 199 that allows for water or sand to be fed into the hollow center of the base 112. The purpose of the water or sand is to weight the base 112. Once the base 112 has been weighted, the ballast hole 199 is plugged with the insert plug 114. The footing 113 and the center hold down pin 116 are also attached to the base 112.

The purpose of the center hold down pin 116 is to fit within the ground post 108. The center hold down pin 116 and the ground post 108 are centered on the same line. The ground post 108 holds the base 112 in position during usage. The center hold down pin 116 is a pipe that is attached to the bottom 125 of the base 112.

The purpose of the footing 113 is to hold the vertical pole shaft 124, a stability shaft 123, a plurality of support flanges 120, and a lock pin 115. The stability shaft 123 is a pipe that is attached to the top 126 of the base 112. The support shaft 124 is a pipe that is attached to the top 126 of the base 112. The support shaft 124 is selected so that size of an inner diameter 198 of the support shaft 124 is greater than an outer vertical pole diameter 197 of the vertical pole 102. Moreover, the vertical pole 102 has an inner vertical pole diameter 196 that is greater than a stability outer diameter 195 of the stability shaft 123.

The stability shaft 123 is mounted so that a centerline 300 of the shaft is perpendicular to the surface of the top 126 of the base 112. The support shaft 124 is mounted over the stability shaft 123 so that the support shaft 124 and the stability shaft 123 are both centered on the centerline 300.

The plurality of support flanges 120 are two or more plates that are attached to base 112 and the support shaft 124. The purpose of the plurality of support flanges 120 is to strengthen and support the support shaft 124, especially in cases when the vertical pole 102 shifts. The vertical pole 102 has a first hole 188 formed in it and the support shaft 124 has a second 187 hole formed in it. When the vertical pole 102 is inserted in the support shaft 124, the first hole 188 and the second hole aligned, a lock pin 115 is inserted through the first hole and the second hole. This prevents the vertical pole 102 from rotating within the support shaft 124.

The ground post 108 is a pipe that is adapted to be set into the ground surface 200. The ground post 108 is selected so that an inner ground diameter 170 of the ground post 108 is greater than an outer center diameter 171 of the center hold down pin 116.

The primary purpose of the vertical pole 102 is to provide a structure to raise the top pole 103. When in use, the first end 127 of the vertical pole 102 is inserted into the support shaft 124 so that the stability shaft 123 fits into the center of the vertical pole 102. The purpose of the stability shaft 123 is to help secure the vertical pole 102 and prevent it from shifting within the support shaft 124.

A second end 128 of the vertical pole 102 is connected to a third end 129 of the top pole 103. The top pole 103 is connected to the vertical pole 102 so that a top centerline 301 of the top pole 103 radiates perpendicularly away from the centerline 300 of the vertical pole 102. A pulley 105 is attached to a fourth end 130 of the top pole 103.

A brace 104 is used to support the top pole 103. The brace 104 is made of a pipe. A fifth end 131 of the brace 104 is attached to the vertical pole 102. A sixth end 132 of the brace 104 is attached to the top pole 103. The brace 104 is at an approximate 45 degree angle to the centerline 300 of the vertical pole 102. The brace 104 is also set at an approximate 45 degree angle to the top centerline 301 of the top pole 103. The brace 104 is set so that there is at least 4 inches of space between the fourth end 130 of the top pole 103 and the sixth end 132 of the brace 104.

The pulley 105 is attached to the fourth end 130 of the top pole 103. To attach the pulley 105, a fifth hole 164 and a sixth hole 165 are formed into the fourth end 130 of the top pole 103. The pulley 105 is attached to a bolt secured through the fifth hole 164 and the sixth hole 165.

The associated hardware comprises rope 111, a rope hook 107, a plurality of hold down pins 110, and nuts and bolts to assemble the invention 100. A third hole 163 and a fourth hole 162 are drilled through walls the vertical pole 102. The rope hook 107 is secured to the vertical pole 102 by bolting the rope hook 107 in place through third hole 163 and the fourth hole 162. The plurality of hold down pins 110 are commercially available tie down/wind stakes that are set into the ground surface 200, and are used to further secure the stand 101 in position. As discussed below, nuts and bolts may be used to The optional accessories comprise a stick holder 106 and a top connector 109. The stick holder 106 is one or more pipes that are affixed to the vertical pole 102. The purpose of the stick holder 106 is to provide a storage space for a piñata stick 500 when not in use. The purpose of the top connector 109 is to provide a protective cover for the ground post 108 to be used to protect the ground post 108 from filling with dirt and debris when the invention 100 is disassembled. The ground post 108 is permanently set in the ground surface 200 during installation and use.

To install and use the invention 100, the ground post 108 is first set into the ground surface 200, and, if necessary, cleaned of dirt and debris. The ground post 108 is a permanent installation and would not be removed when the invention 100 is subsequently disassembled. The stand 101 is then put into place by inserting the center hold down pin 116 into the ground post 108. The stand 101 is further secured using the plurality of hold down pins 110 by setting each individual hold down pin into the ground and attaching it to the stand 101. The first end 127 of the vertical pole 102 is then inserted into the support shaft 124 of the footing 113 and secured with the lock pin 115. The third end 129 of the top pole 103 is attached to the second end 128 of the vertical pole 102 and the brace 104 is fitted into of the top pole 103. A rope 111 is threaded through the pulley 105. The first end of the rope 111 is adapted to be attached to a piñata 117. Once the rope 111 is secured to the piñata 117, the piñata 117 can be raised to the desired position will be held in place once the second end of the rope 111 is tied off onto the rope hook 107.

The base 112 and the insert plug 114 can be made of molded polyethylene. The footing 113 and center hold down pin 116 may be molded as part of the base 112 or may be fabricated separately and attached using standard hardware and plumbing fittings. When the footing 113 and center hold down pin 116 are fabricated separately, the center hold down pin 116, stability shaft 123 and support shaft 124 can be made of pipes including, but not limited to, copper, aluminum or PVC pipes. The each of plurality of support flanges 120 are plates that can be made of, but are not limited to, copper, aluminum, PVC, polyethylene, or polycarbonate. The plurality of support flanges 120 can be connected to the support shaft 124 using collars and hardware. If made of metal, the plurality of support flanges 120 may also be brazed to the support shaft 124

The ground post 108, brace 104, and stick holder 106 can be made from pipes including, but not limited to, copper, aluminum or PVC pipes. The top connector 109 can be a standard end cap or end plug for commercially available pipes.

The vertical pole 102 and the top pole 103 can each be made of a single pipe including, but not limited to, copper, aluminum or PVC pipes. The vertical pole 102 and top pole 103 can be attached using a 90 degree plumbing fitting. The brace 104 can then be welded, brazed, or bolted into position. Alternatively, the vertical pole 102 and the top pole 103 can each be made of a two individual pipes and a 45 degree "y" fitting including, but not limited to, copper, aluminum or PVC pipes and fittings. In the alternate configuration, the two "y" fittings allow for the connection of the brace 104.

The pulley 105 is a standard commercially available pulley. The rope 111 can be any type of twine, cord or rope that has the break strength required to support the piñata 117. The rope hook 107 can be a commercially available hook screw or eyehook screw. The plurality of hold down pins 110 may be tent anchors or heavier duty auger anchors.

Detailed reference will now be made to a first potential embodiment of the disclosure, which is illustrated in FIGS. 1 through 6.

FIG. 1 shows an projection view of the invention 100 and shows stand 101 comprising the base 112, center hold down pin 116, the footing 113, and the insert plug 114 and the lock pin 115. FIG. 1 also shows the support shaft 124, the lock pin 115 and a first support flange 121 and a second support flange 122. FIG. 1 also shows the assembly of the vertical pole 102, top pole 103 and brace 104 as well as the pulley 105, the installation hardware 133 of the pulley 105, the rope hook 107 and the installation hardware 134 of the rope hook 107. The stick holder 106 is comprised of 2 small pipes in the first potential embodiment.

Figure 2:
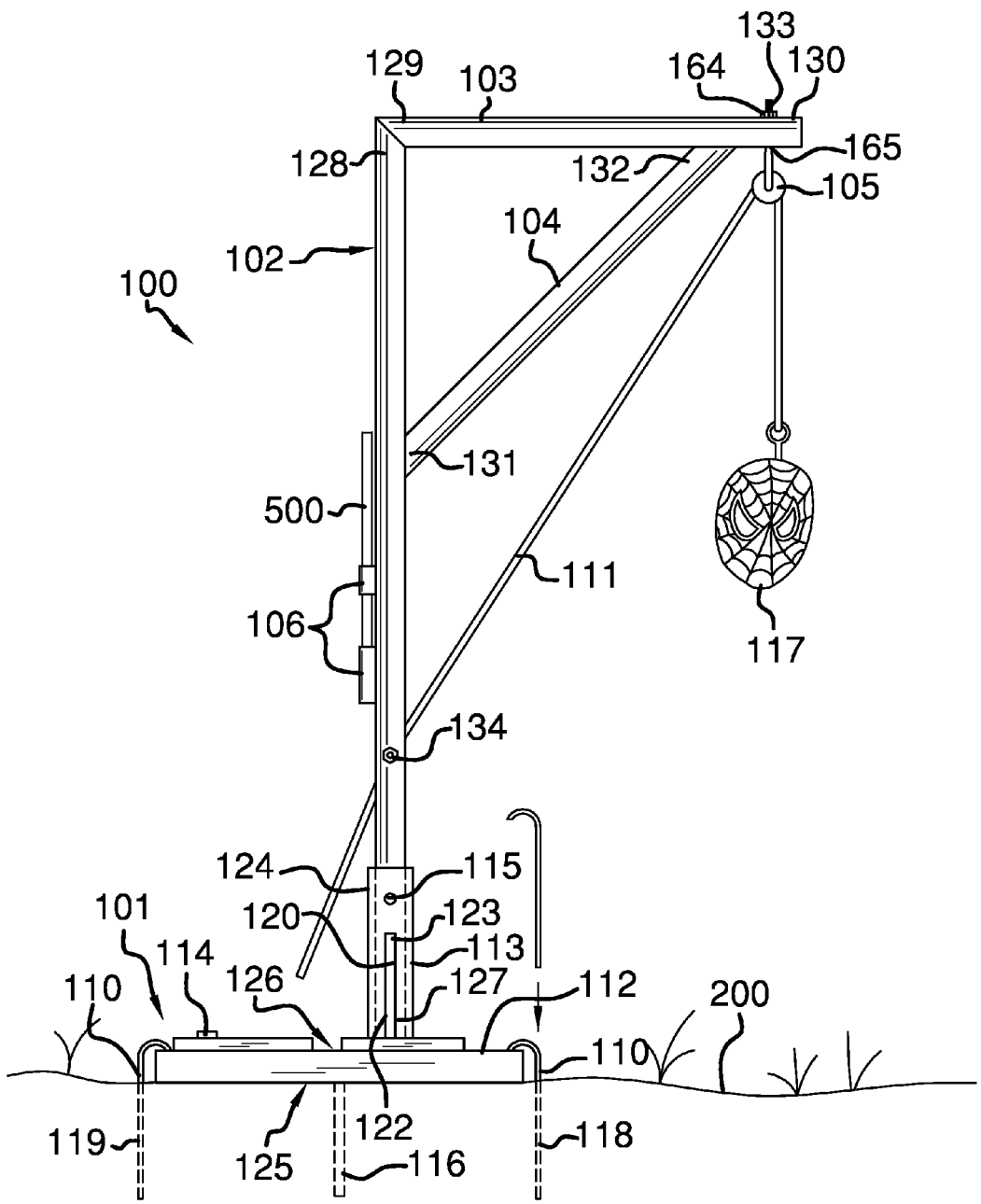
FIG. 2 is an in-use side view of an embodiment of the disclosure.

FIG. 2 shows a side view of the invention 100 in use including the piñata 117, the rope, 111, and the use of a first hold down pin 118 and a second hold down pin 119.

Figure 3:
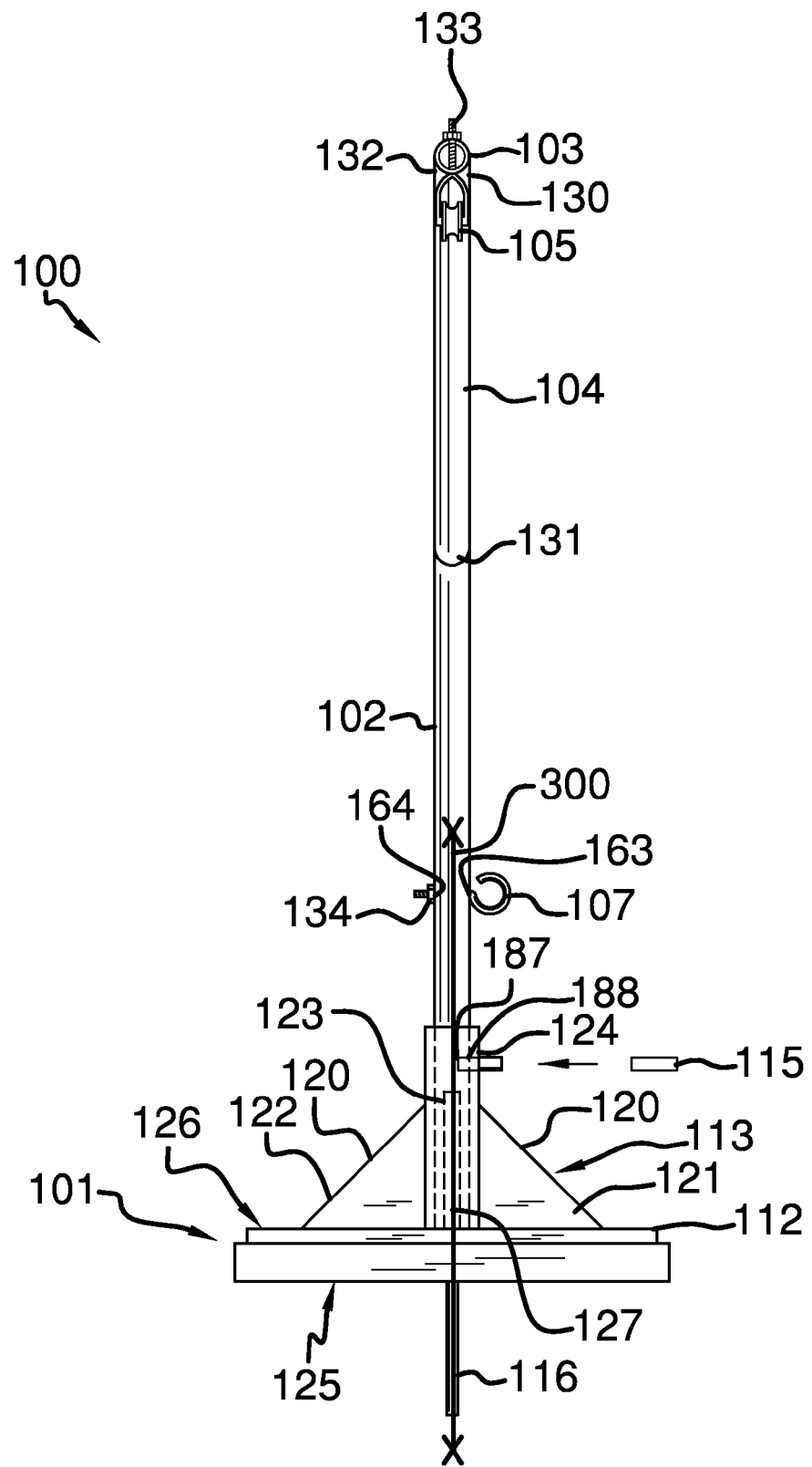
FIG. 3 is a front view of an embodiment of the disclosure.

FIG. 3 shows a front view of the invention 100 including the use of the lock pin 115.

Figure 4:
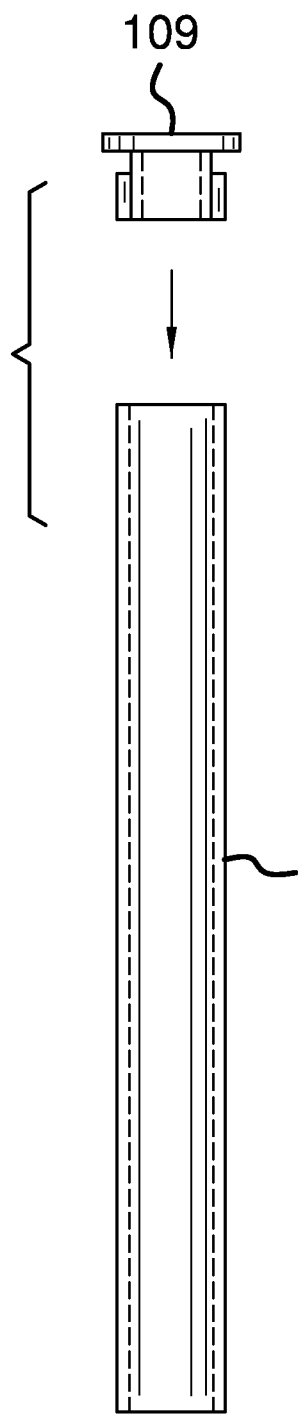
FIG. 4 is a close front view of a detail of the embodiment of the disclosure.
Figure 5:
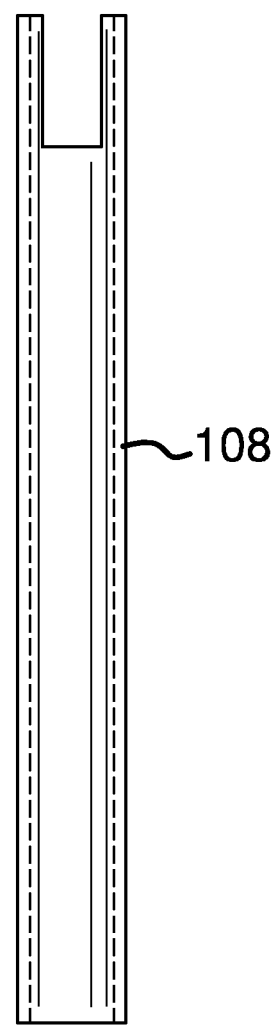
FIG. 5 is a close side view of a detail of the embodiment of the disclosure.
Figure 6:
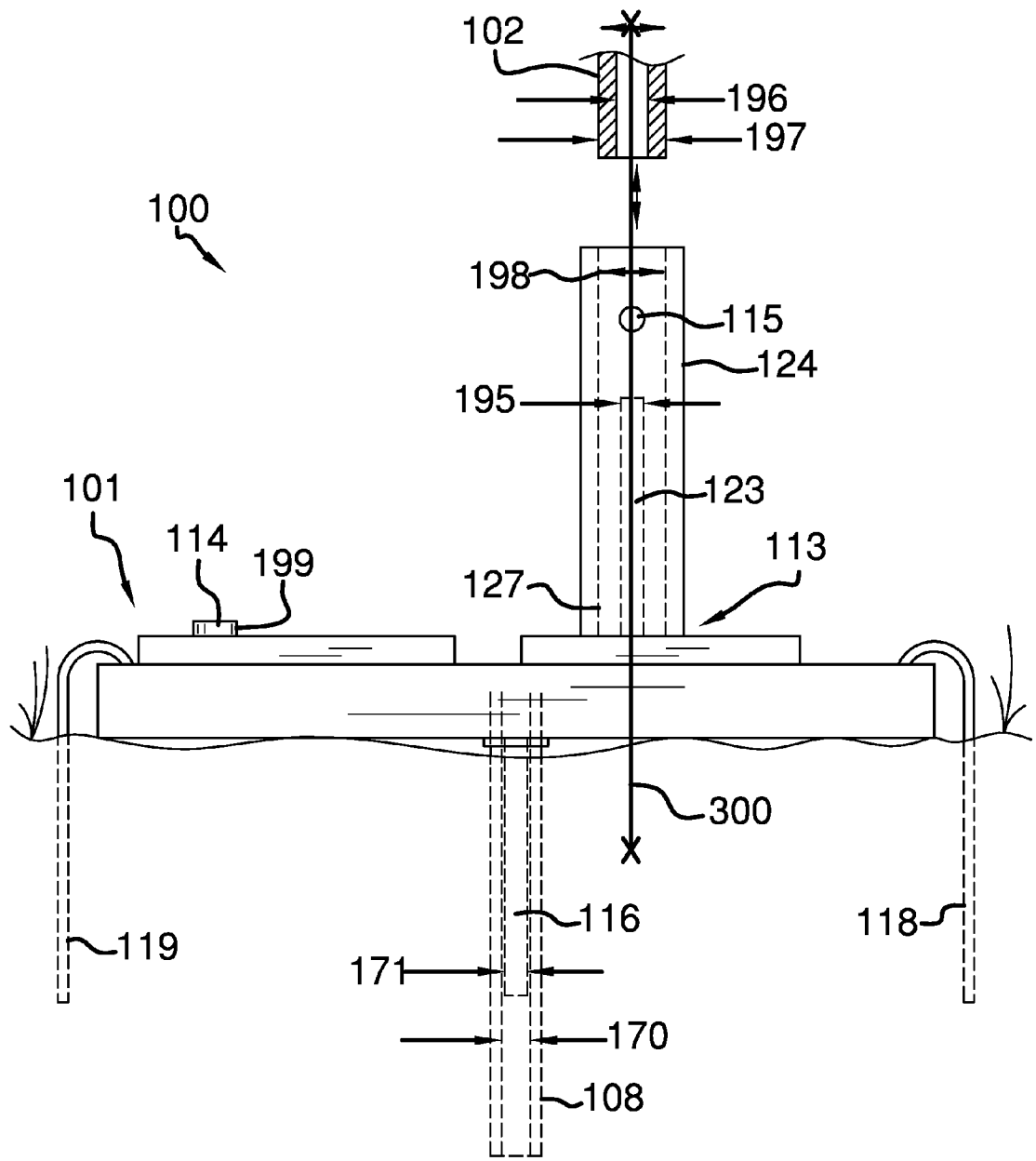
FIG. 6 is a close view of a detail of the embodiment of the disclosure.

FIGS. 4 and 5 show front and side views of the ground post 108 and the top connector 109. In the first potential embodiment, the top connector 109 is an end cap.

Figure six is a detailed in use view of the stand 101 and the ground post 108. This view clearly shows the center hold down pin 116 inserted into the ground post 108, the stability shaft 123, and the first hold down pin 118 and the second hold down pin 119.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A piñata pole support assembly comprising:
a ground post adapted to be mounted into a ground surface;
a stand that is affixed to the ground post in order to secure said stand to the ground surface;
a vertical pole is secured to the stand and extends vertically;
a top pole is secured to the vertical pole, and is perpendicularly-oriented therefrom;
a brace is acutely affixed between both the vertical pole and the top pole; and
a pulley is affixed to the top pole, and secure a rope that is adapted to be attached to a piñata;
wherein the stand is further defined with a base, a footing, a lock pin, a center hold down pin, and an insert plug;
wherein a bottom of the base is adapted to be placed on said ground surface; wherein a top of the base is opposite of the bottom of the base; wherein the base is formed with a ballast hole that allows for a weighted material to be fed into a hollow center of the base; wherein the ballast hole is plugged with the insert plug; wherein the footing and the center hold down pin are also attached to the base;
wherein the purpose of the center hold down pin is to fit within the ground post; wherein the center hold down pin and the ground post are concentrically oriented with respect to one another; wherein the center hold down pin is attached to the bottom of the base.

2. The piñata pole support assembly according to claim 1 wherein the footing comprises a support shaft, a stability shaft, a plurality of support flanges, and the lock pin.

3. The piñata pole support assembly according to claim 2 wherein the stability shaft is a pipe that is attached to the top of the base; wherein the support shaft is a pipe that is attached to the top of the base.

4. The piñata pole support assembly according to claim 3 wherein the support shaft is selected so that an inner diameter of the support shaft is greater than an outer vertical pole diameter of the vertical pole.

5. The piñata pole support assembly according to claim 4 wherein the vertical pole has an inner vertical pole diameter that is greater than a stability outer diameter of the stability shaft.

6. The piñata pole support assembly according to claim 5 wherein the stability shaft is mounted so that a centerline of the shaft is perpendicular to the surface of the top of the base; wherein the support shaft is mounted over the stability shaft so that the support shaft and the stability shaft are both centered on the centerline.

7. The piñata pole support assembly according to claim 6 wherein the plurality of support flanges are further defined with two or more plates that are attached to the base and the support shaft; wherein the plurality of support flanges strengthen and support the support shaft.

8. The piñata pole support assembly according to claim 7 wherein the vertical pole has a first hole formed in it and the support shaft has a second hole formed in it; wherein the vertical pole is inserted in the support shaft, the first hole and the second hole align; wherein when the first hole and the second hole are aligned, the lock pin is inserted through the first hole and the second hole.

9. The piñata pole support assembly according to claim 8 wherein the ground post is a pipe that is adapted to be set into the ground surface; wherein the ground post has an inner ground diameter that is greater than an outer center diameter of the center hold down pin.

10. The piñata pole support assembly according to claim 9 wherein a first end of the vertical pole is inserted into the support shaft so that the stability shaft fits into the center of the vertical pole; wherein the stability shaft further secures the vertical pole and prevent the vertical pole from shifting within the support shaft.

11. The piñata pole support assembly according to claim 10 wherein a second end of the vertical pole is connected to a third end of the top pole; wherein the top pole is connected to the vertical pole so that a top centerline of the top pole radiates perpendicularly away from the centerline of the vertical pole.

12. The piñata pole support assembly according to claim 11 wherein a fifth end of the brace is attached to the vertical pole; wherein a sixth end of the brace is attached to the top pole; wherein the brace is at an approximate 45 degree angle to the centerline of the vertical pole; wherein the brace is also set at an approximate 45 degree angle to the top centerline of the top pole.

13. The piñata pole support assembly according to claim 12 wherein the pulley is attached to a fourth end of the top pole; wherein a fifth hole and a sixth hole are formed adjacent the fourth end of the top pole; wherein the pulley is attached via a bolt secured through the fifth hole and the sixth hole.

14. The piñata pole support assembly according to claim 13 wherein a third hole and a fourth hole are provided on the vertical pole; wherein a rope hook is secured to the vertical pole by bolting the rope hook in place through third hole and the fourth hole; wherein a plurality of hold down pins are adapted to be set into the ground surface in order to further secure the stand.

15. The piñata pole support assembly according to claim 14 wherein a stick holder is affixed to the vertical pole; wherein the stick holder is adapted to provide a storage space for a piñata stick when not in use.

\* \* \* \* \*